United States Patent Office

3,309,166
Patented Mar. 14, 1967

3,309,166
METHOD OF PURIFYING DRY CLEANING SOLVENTS
Alfonso Moncada, 21 3rd Place, Brooklyn, N.Y. 11231, Vincenzo Moncada, 4015 5th Ave., Brooklyn, N.Y. 11232, and John Moncada, 150 21st St., Brooklyn, N.Y. 11232
No Drawing. Filed Aug. 23, 1963, Ser. No. 304,266
4 Claims. (Cl. 8—142)

This invention relates to the dry cleaning of garments, fabrics and the like. More particularly, this invention relates to an improved dry cleaning operation for the cleaning of garments, fabrics and the like wherein a substantially anhydrous, organic solvent liquid is employed to remove, extract and/or dissolve dirt, grime, grease and the like from soiled garments and fabrics.

In accordance with one embodiment this invention relates to an improved adsorbent for effecting purification or regeneration of the organic solvent liquid employed in a dry cleaning operation and containing contaminants, such as oil, grease, fats, dirt, grime and the like, dissolved and/or dispersed therein. In accordance with another embodiment this invention relates to an improved dry cleaning process employing a special adsorbent material to effect the regeneration or purification of the dry cleaning solvent liquid intermittently and/or continuously during the dry cleaning operation.

In a conventional dry cleaning operation soiled garments, fabrics and the like are washed with a substantially anhydrous dry cleaning solvent, such as carbon tetrachloride, trichloroethylene, perchloroethylene or a petroleum base hydrocarbon solvent, such as Stoddard solvent or VMP naphtha, to release and/or to dissolve dirt and grime and the like from the articles being cleaned. The thus-released dirt and grime may comprise solvent insoluble solid particles which remain suspended in the solvent liquid and/or may comprise solvent soluble materials which are dissolved in the solvent liquid. The suspended solid materials are readily removed from the solvent liquid by filtration.

It has been the practice to remove the solvent soluble contaminants from the solvent liquid by passing the contaminated solvent liquid through a mass or bed of activated carbon, such as activated carbon prepared from lignite, a coal-like material, activated by means of high temperature and steam and usually commercially available as finely-divided black powder, each particle of the powder being highly porous and sponge-like in structure.

In a dry cleaning operation it has been estimated that about 100 pounds of woolen garments release to the dry cleaning solvent liquid during the dry cleaning operation about one-half pound of solvent soluble contaminants or soil and about one pound of solvent insoluble contaminants or soil. The insoluble soil or contaminants consist of dirt, grime, lint and other solids which are dispersed or suspended in the solvent liquid and are easily picked up and removed by passing the contaminated solvent liquid through a filter. The solvent soluble contaminants or soil, however, are dissolved in the solvent liquid and must be removed by means other than by filtration.

One technique used to effect removal of the solvent soluble contaminants involves the use of a selective adsorbent. The solvent soluble contaminants are mostly organic materials and comprise usually wool-grease, fatty acids, grease, unsaponified fats, mineral oil, natural colors, dyes and other materials. If these solvent soluble materials are not removed or maintained at a suitable low level in the solvent liquid prior to or during the dry cleaning operation the solvent liquid soon becomes unfit for dry cleaning purposes. Of the contaminants usually present in soiled garments and the like perhaps the most troublesome and most undesirable contaminants are the fatty acids, usually referred to in the trade as free fatty acids. Unless the fatty acid contaminants are removed from the solvent liquid an undesirable odor may be imparted to the garment during the dry cleaning operation.

In conventional dry cleaning operations various solvent aids are employed to effect the cleaning of garments and to improve the effectiveness and versatility of the dry cleaning solvent employed therein. One such material or additive generally employed is a soap, detergent or surfactant which serves as a water emulsifying agent to form a stable water emulsion of any water which may accumulate in the dry cleaning solvent. A small amount of water is employed in dry cleaning operations, usually as a preparatory treatment, for the removal of water-soluble stains from the garments.

The surfactant or soap is usually added to the dry cleaning solvent liquid dissolved in a suitable solvent, such as an alcohol, which is miscible in water and in the dry cleaning solvent. A typical dry cleaning soap is the so-called mahogany soaps, e.g., sodium naphtha sulfonates.

It has been observed that when conventional activated carbon is employed as the selective adsorbent to remove dissolved contaminants from the dry cleaning solvent liquid, the activated carbon tends also to adsorb the dry cleaning soap and other aids added to the dry cleaning solvent liquid to the detriment of the dry cleaning operation. It would appear that in some instances conventional activated carbons adsorb and remove these soaps and other dry cleaning aids, such as other surfactants or emulsifying agents, from the dry cleaning solvent preferentially to the undesirable fatty acids and other contaminants.

Accordingly, it is an object of this invention to provide an improved dry cleaning operation.

Another object of this invention is to provide an improved adsorbent for use in a dry cleaning operation in connection with the purification and/or regeneration of the dry cleaning solvent liquid.

Still another object of this invention is to provide a dry cleaning process which yields a brighter and cleaner garment.

Yet another object of this invention is to provide a dry cleaning process employing a specially selected adsorbent in accordance with this invention which prolongs the life and increases the effectiveness of the dry cleaning solvent and which results in a more effective and better dry cleaning operation.

How these and other objects of this invention are accomplished will become apparent in the light of the accompanying disclosure.

In accordance with this invention we have now discovered that an admixture comprising bone char and an active material selected from a group consisting of activated carbon and activated clay yields superior results when employed in a dry cleaning operation to effect a treatment and/or purification of the dry cleaning solvent.

In accordance with this invention it has been discovered that an admixture of bone char and activated carbon and/or clay permits the cleaning of dirty dry cleaning solvent by the removal of free fatty acids and color bodies therefrom. It would appear that the special adsorbent containing bone char, together with an active material, in effecting the removal of the free fatty acids from the dry cleaning solvent converts these acids to soaps which tend to be released to the dry cleaning solvent. If these soaps are permitted to build up therein these soaps would be redeposited on the garments undergoing the cleaning. The active material, activated carbon and/or activated clay, employed in association with the bone char in accordance with the practice of this invention to remove color bodies from the dry cleaning solvent, also serves to keep the soap content of the dry cleaning solvent under control by adsorbing the soaps from the dry solvent. The bone char component of the adsorbent tends to produce or generate soaps in situ during the dry cleaning operation and the active material component, activated clay and/or activated carbon, maintains the soap concentration at a satisfactory level in the solvent. Enough soap can be generated in situ by the adsorbent to eliminate any required addition of soap to the dry cleaning solvent.

Various types of bone char, natural or synthetic, virgin or reactivated or spent, granular or powdered, such as bone black, may be employed in the practice of this invention. The term "bone char" as employed herein is intended to include natural bone char, synthetic bone char and related materials such as phosphate rock and related phosphate-containing materials such as dicalcium phosphate, monocalcium phosphate, and the like and mixtures thereof.

Natural bone char, i.e., the residue obtained by the thermal decomposition of animal bones, is preferred in the practice of this invention. A representative chemical analysis of a natural bone char, e.g., a bone black, is approximately as follows: 76.7% ash, 21.3% carbon, 30.6% $P_2O_5$. The bone char component of the special adsorbent of this invention, after use in the treatment of dry cleaning solvent, indicates a $P_2O_5$ content of about 28.3%, a reduction in $P_2O_5$ content of about 19% apparently due to soap formation by reaction with the free fatty acids.

So-called synthetic bone chars are also useful in the practice of this invention. For example, synthetic bone chars manufactured and sold by the Baugh Chemical Company of Baltimore, Maryland, under the trademark "Synthad" are useful. Various materials and method may be employed for the manufacture of these synthetic bone char materials, see U.S. Patents 2,170,601, 2,226,421, 2,352,932, 2,735,823, 2,831,818, 2,914,431 and 3,021,287. The disclosures of these patents with respect to the manufacture of synthetic bone char materials are herein incorporated and made part of this disclosure.

Activated carbon comprises another component of the compositions in accordance with this invention. Like the bone char component, the activated carbon may be in granular or powdered form. The various commercially available activated carbons may be employed in the composition of this invention. Suitable activated carbons include those activated carbons manufactured and sold under the trademarks "Cal," "Norit," "Darco," "Nuchar," "Charkote," "Kleen," "Jet Combo" and others.

Activated or adsorptive clays comprise another component with the bone char in compositions of this invention, with or without activated carbons. Suitable such activated clays include fuller's earth and Tonsil.

The following admixtures have been found suitable in the practice of this invention for the treatment and purification of dry cleaning solvents:

(A) 3 parts by weight bone char and 2 parts by weight activated carbon.

(B) 7 parts by weight bone char and 5 parts by weight activated carbon.

(C) 3 parts by weight bone char and 1 part by weight activated carbon. It has been found that this particular mixture substantially eliminates the usually required addition of soaps to the dry cleaning solvent.

(D) 3 parts by weight bone char, 2 parts by weight activated carbon and 1 part by weight of an activated clay such as fuller's earth or Tonsil.

(E) 3 parts by weight bone black, a powdered bone char having a particle size below about 325 mesh, and 2 parts by weight activated carbon.

(F) 2 parts by weight bone char, 1 part by weight activated carbon and 1 part by weight of an activated clay such as fuller's earth or Tonsil.

(G) 1 part by weight bone char and 1 part by weight activated clay such as fuller's earth or Tonsil.

The special treating agents of this invention when employed in a dry cleaning operation or when employed to effect the purification of contaminated dry cleaning solvent, may be in the form of a porous, permeable fixed bed, such as in a treating tower or vessel, or as a coating such as a coating on or a liner within a filter element or cartridge, through which the contaminated dry cleaning solvent is percolated or flowed.

The various solvents well known in the dry cleaning trade may be satisfactorily treated by the special adsorbent compositions of this invention. These dry cleaning solvents include not only the relatively low flash hydrocarbon or petroleum solvents such as VMP naphtha, Stoddard solvent but also the halogenated hydrocarbons, such as halogenated $C_1$ and $C_2$ hydrocarbons, e.g., carbon tetrachloride, trichloroethylene, perchloroethylene and a recently introduced halogenated hydrocarbon dry cleaning solvent, believed to be a chlorofluoroethylene, manufactured and sold by E. I. du Pont de Nemours and Company, Inc., under the trademark "Valclene."

In a dry cleaning operation the solvent charge serves a dual purpose: (1) to remove the non-aqueous soluble soils and (2) to remove the water-soluble soils. The preponderance of non-aqueous dry cleaning solvent in the solvent charge easily handles the non-aqueous soluble soils. However, the amount of water which heretofore could be used in the solvent charge was limited. This, in turn, curtailed or restricted the effectiveness of the soaps added to the solvent charge to improve the cleaning operation. If the solvent charge contained an amount of water sufficient to assure that the added soaps functioned with maximum effectiveness, this amount of water would tend to trigger a re-deposition of the dissolved free fatty acids from the non-aqueous solvent onto the garments undergoing cleaning. As a result in conventional practice the make-up or composition solvent charge has heretofore been a compromise at the expense of thoroughly cleaned garments because the amount of water added to the solvent charge was below the amount required by the added soaps for maximum effectiveness.

This failure or shortcoming of conventional dry cleaning practices is corrected when a purifier or treating agent of the type disclosed herein is employed in the treatment of the dry cleaning solvent.

The special dry cleaning solvent treating agents of this invention chemicaly conrol the build-up of free fatty acids in the dry cleaning solvent by saponification of these free fatty acids. This chemical control of the free fatty acid content within the dry cleaning solvent by the special treating agents herein permits more water to be used in the solvent charge without undue danger of re-deposition of the free fatty acids onto the garments being cleaned. The higher water content of dry cleaning solvents permissible when the treating agents of this invention are employed permits the added soaps to function more effectively by more thoroughly washing out the water-soluble soils from the garments, leaving the garments cleaner and brighter. Accordingly, a dry cleaning solvent operation carried out in accordance with this invention permits the simultaneous washing out of both aqueous and non-aqueous soluble soils, including dust and other insoluble, loosely attached soils.

When the special dry cleaning solvent treating agents of this invention are employed in a dry cleaning operation it has been observed that the cleaned garments exhibit a soft sheen and are cleaner with no trace of musty odors. Also the colors of the cleaned garments are brighter and more sharply defined and the garments are softer in texture due to the substantial removal of free fatty acids from the garments. Also, when the special treating agents of this invention are employed in a dry cleaning operation the free fatty acids are removed from the dry cleaning solvent and tend to be converted to soaps. The usually required addition of dry cleaning soaps or detergents to the solvents is thereby substantially reduced or eliminated.

By way of example it has been found that in a dry cleaning operation employing a daily dosage of one pound of activated carbon, it is required, in a 150 gallon system, to distill about 40 gallons of solvent a day to maintain the dry cleaning solvent in satisfactory condition. In the same system employing only 10 ozs. of bone char or bone black per day the distillation is reduced to about 20 gallons per day. When, however, in the same system a dosage of 10 ozs. of an admixture of bone black and activated carbon in accordance with this invention is employed the distillation requirements are substantially eliminated and drop to about 7 to 8 gallons per day. It is thus seen that the special treating agents of this invention not only drastically reduce the routine distillation requirements in a dry cleaning operation by at least about half but also reduce the usually required soap addition by about half.

In a special embodiment of this invention employing a treating composition made up of 2 parts by weight bone char and 1 part by weight activated carbon and 1 part by weight activated clay, such as fuller's earth or Tonsil, the above composition being employed on a daily basis in the treatment of dry cleaning solvent, the addition of about 1 part by weight activated clay following the routine treatment of the dry cleaning solvent with the above admixture substantially eliminates any distillation requirements to maintain the dry cleaning solvent in satisfactory condition.

The dry cleaning solvent treating agents in accordance with this invention comprise a substantial amount, at least about 25% by weight, preferably at least about 50% by weight bone char, the remainder being activated carbon and/or activated clay such as fuller's earth or Tonsil. A composition containing a major amount of bone char and a minor amount of activated carbon has been found to yield satisfactory results.

This invention is related to the invention described in our co-pending application Ser. No. 245,816 filed December 19, 1962, which discloses the treatment of contaminated solvent with bone char to effect purification. The disclosures of this application are herein incorporated and made part of this disclosure.

As will be apparent to those skilled in the art in the light of the foregoing disclosure, many modifications, alterations and substitutions are possible in the practice of this invention without departing from the scope thereof.

We claim:

1. A method of treating dirty dry cleaning fluid to remove contaminants therefrom which comprises contacting said dirty dry cleaning fluid with an admixture, consisting essentially of 1–7 parts by weight of bone char and 1–5 parts by weight of an active material selected from the group consisting of activated carbon and an adsorptive clay.

2. In a dry cleaning operation wherein garments and the like are washed by contact with a dry cleaning solvent liquid, the dry cleaning solvent liquid removed from contact with the garments and treated for the removal of solvent soluble contaminants by contact with a solid adsorbent capable of adsorbing at least a portion of said contaminants, the improvement which comprises employing as said solid adsorbent an admixture of 1–7 parts by weight of bone char and 1–5 parts by weight of an active material selected from a group consisting of activated carbon and adsorptive clay.

3. A method of dry cleaning fabrics, garments and the like, which comprises washing said garments, fabrics and the like with a dry cleaning solvent liquid to remove dirt, grease, grime and other contaminants therefrom, recovering said dry cleaning solvent liquid, now containing the aforesaid contaminants suspended and/or dissolved therein, from the washing operation, filtering the recovered dry cleaning solvent liquid to remove suspended solid materials therefrom, contacting the resulting substantially solids-free dry cleaning solvent liquid with a particle-form of admixture of an active material selected from a group consisting of activated carbon and activated clay to effect at least partial removal of the contaminants dissolved in said dry cleaning solvent liquid and returning the resulting dry cleaning solvent liquid to contact additional garments and the like to clean the same.

4. A daily, routine treatment of dirty dry cleaning solvent to effect purification thereof, comprising contacting said solvent during a dry cleaning operation with an admixture consisting essentialy of about 2 parts by weight bone char, 1 part by weight activated carbon and 1 part by weight adsorptive clay and at the termination of the dry cleaning operation on a daily basis additionally contacting said solvent with adsorptive clay.

No references cited.

J. TRAVIS BROWN, *Primary Examiner.*

J. H. RAUBITSCHEK, *Assistant Examiner.*